March 11, 1941.　　　O. GANO　　　2,234,595
EXTRUDING DEVICE
Filed April 11, 1938　　　2 Sheets-Sheet 1
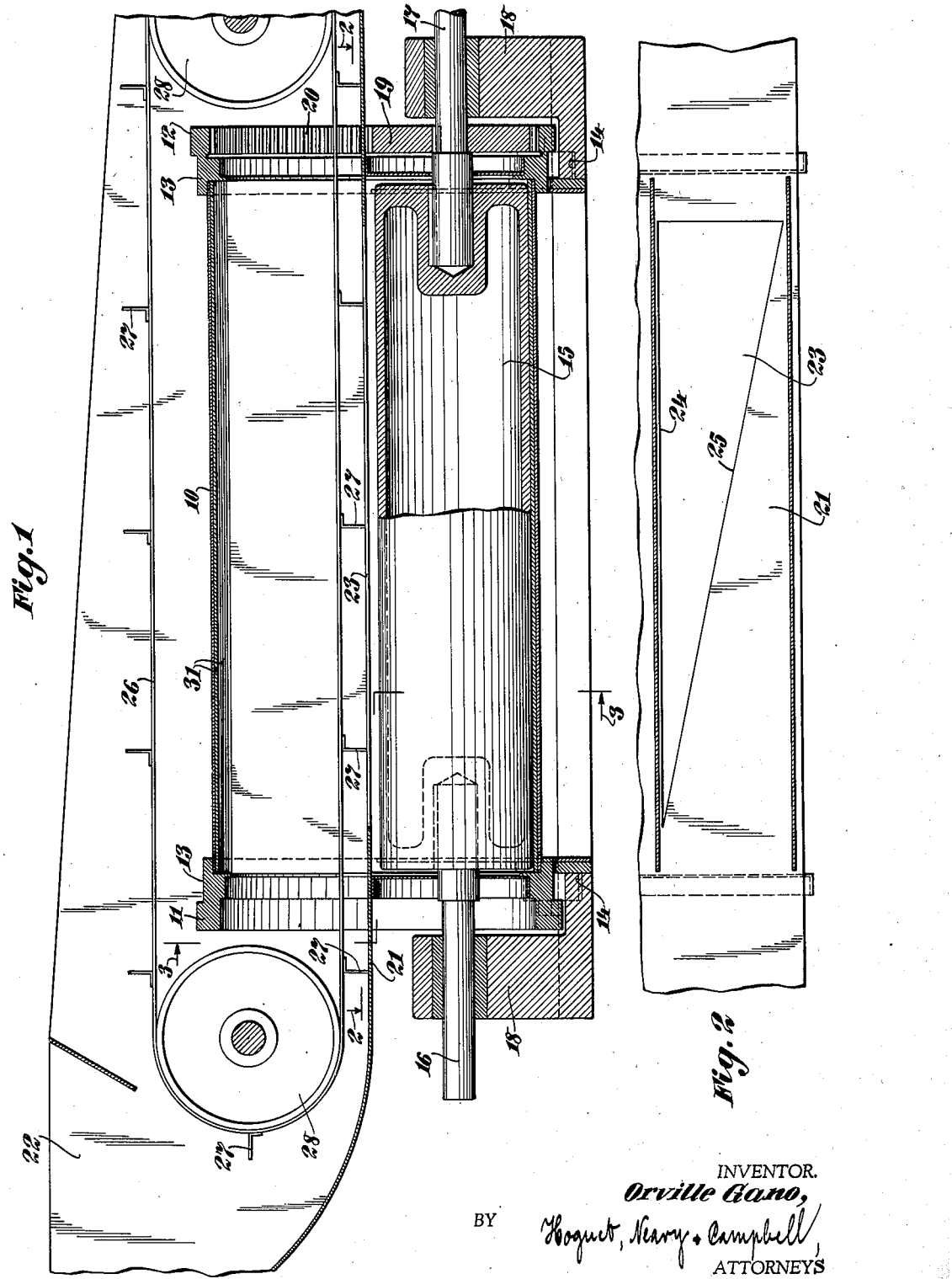
INVENTOR.
Orville Gano,
BY Hoguet, Neary + Campbell,
ATTORNEYS March 11, 1941.       O. GANO       2,234,595
EXTRUDING DEVICE
Filed April 11, 1938       2 Sheets-Sheet 2

INVENTOR.
Orville Gano,
BY Hoguet, Neary & Campbell,
ATTORNEYS

Patented Mar. 11, 1941

2,234,595

UNITED STATES PATENT OFFICE 2,234,595

EXTRUDING DEVICE

Orville Gano, Burley, Idaho, assignor to Potato Corporation of Idaho, Garwood, N. J., a corporation of Idaho Application April 11, 1938, Serial No. 201,266

2 Claims. (Cl. 146—90)

This invention relates to an extruding device for forming thin strips or strings from plastic materials. More particularly, it relates to a device by means of which potatoes or other starchy materials may be extruded without damaging or disrupting the starch cells therein to any appreciable extent.

Extruding devices are usually constructed to exert a compressing, kneading and working action on plastic materials to produce rods or threads of the plastic material and shearing and crushing of the material is desirable in order to render the extruded material homogeneous. In treating some substances, for example starch-containing articles such as potatoes, the compressive and shearing action of the extruding devices may be highly undesirable. For example, in the treatment of potatoes to produce a dehydrated product from which mashed potatoes may be made by addition of water or milk, the starch cells should be treated in such a way as to avoid disintegration or disruption. When only a minor proportion of the starch cells are disintegrated, the dried product is mealy and white in color and retains these characteristics upon subsequent conversion into mashed potatoes. Unless great care is taken to prevent the starch granules in the potatoes from being ruptured during treatment, the resulting product will have a gelatinous gluey texture and an undesirable yellow color characteristic of ordinary boiled potatoes that have been allowed to stand in air.

This undesirable result is believed to be the result of a chemical reaction between the constituents of the starch particles. The starch granules forming the potato cells consist of an outer wall and a nucleus which contains substances that form acids when mixed with water. Thus, when a starch granule bursts, the nucleus combines with whatever moisture may be present to form acids which convert the starch granules to a hydrated gelatinous form. It is evident, therefore, that if the desirable mealy character of the potato is to be preserved in the resulting potato product, an extrusion process must be used in which the potatoes may be reduced to the form of thin strips or strings without any substantial damage to the starch granules.

An object of this invention, accordingly, is to provide a device in which potatoes or other similar materials may be simply and effectively extruded without substantial damage to their cell structure.

A further object of the invention is to provide a device of the above character in which the material is firmly and gently pressed through the extruding apertures without substantial rubbing action.

Another object of the invention is to provide an extruding device of the above character in which no sharp edges are presented to the material as it is pressed through the extruding apertures so that its cell structure remains substantially unchanged during the extruding process.

In a preferred embodiment of the invention the material to be extruded is fed between a smooth pressure roller and an elongated cylindrical drum in which a plurality of apertures are formed. The pressure roller and the drum are disposed in such fashion that a line of contact exists between the outer periphery of the pressure roller and the inner periphery of the cylindrical drum. The drum may be directly gear driven from the pressure roller so that at the line of contact the speed of the pressure roller is the same as the speed of the drum and there can be no slipping action between the two. Thus the potatoes are gently and firmly pressed through the apertures in the outer drum without any rubbing action so that the extrusion process is accomplished without any substantial damage to the starch granules in the extruded material. The process is further aided by providing longitudinal rounded ribs between the apertures in the surface of the cylindrical drum which carry the material under the pressure roller without any damage to the cell structure.

Additional advantages will be readily apparent from the following detailed description when taken in connection with the drawings, in which:

Figure 1 is a view in vertical section taken through the axis of the cylindrical drum and illustrating an extruding device constructed in accordance with this invention;

Figure 2 is a view in section taken along line 2—2 of Figure 1, showing the shape of a tapered slot through which material is fed to the extruding device;

Figure 3:
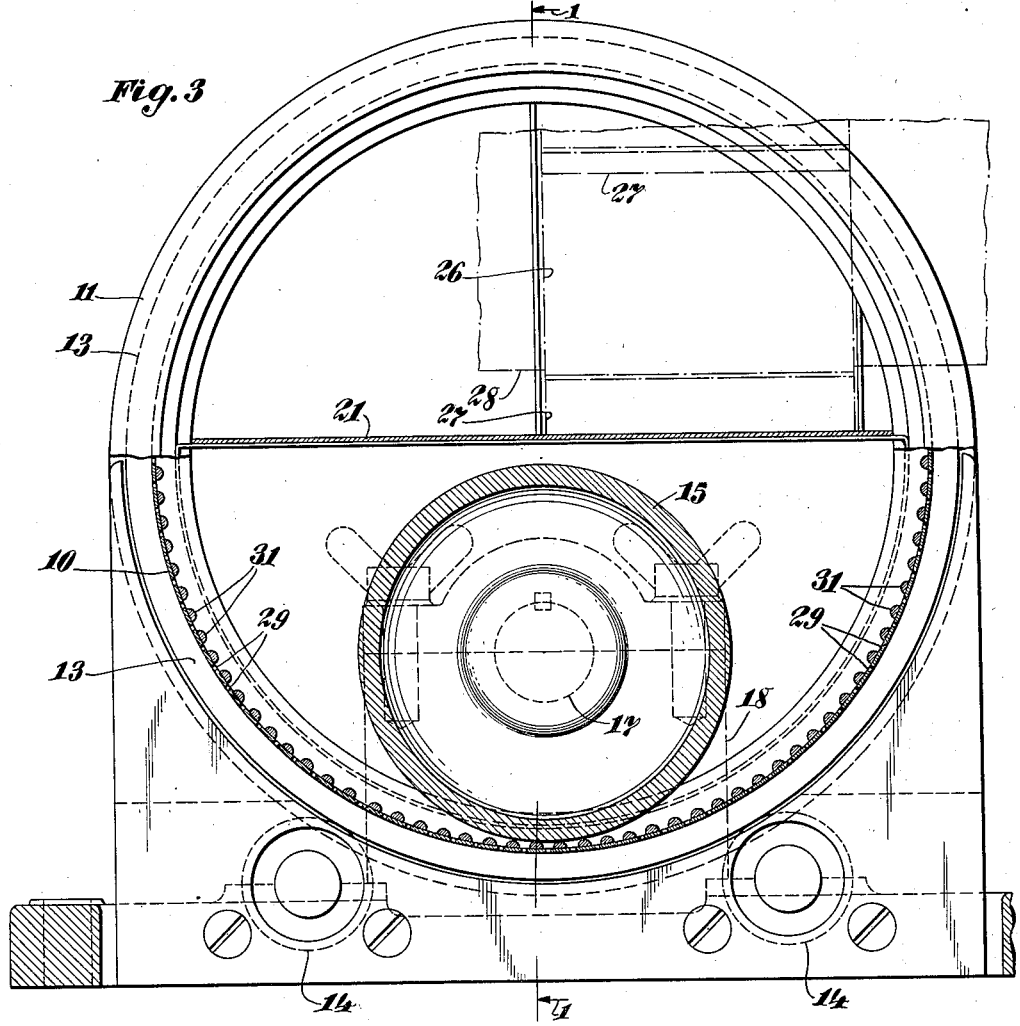
Figure 3 is a view partly in section taken along the line 3—3 of Figure 1 and illustrating the operation of the pressure roller within the cylindrical drum.
Figure 4:
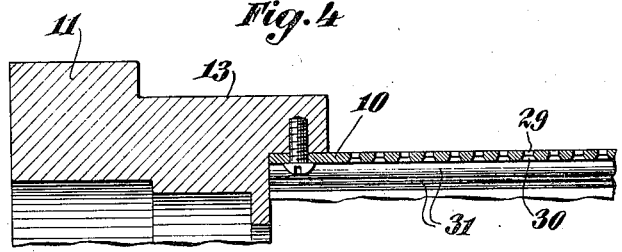
Figure 4 is a partial view in section illustrating the manner in which the cylindrical drum is attached to supporting end rings and also showing the shape of the apertures in the drum.

Referring to Figure 1, a cylindrical drum is shown at 10, at each extremity of which the end supporting rings 11 and 12 are formed. These end supporting rings are provided with shoulders 13 which are adapted to rest on the rollers 14 in such fashion that the drum 10 may be rotated about its axis.

Within the lower half of the cylinder 10 is a smooth-surfaced pressure roller 15 at each end of which are secured the shafts 16 and 17 which are journaled in the bearings 18. The drum 10 is adapted to be driven by a spur gear 19 which is keyed or otherwise secured on the shaft 17 and which is adapted to engage the internal gear 20 forming the inner periphery of the end ring 12.

It will be noted that the pressure roller 15 and the cylinder 10 are so disposed with respect to one another that the outer surface of the pressure roller 15 engages the inner wall of the cylinder 10 along a line extending longitudinally of the cylinder 10. Furthermore, since the drum 10 is directly driven from the pressure roller 15, the outer periphery of the roller 15 and the inner periphery of the cylinder 10 have the same linear velocity at the line of contact so that materials fed between the two moving surfaces are not subjected to any substantial rubbing action.

Above the pressure roller 15, a plate 21 is located which forms the bottom of a hopper 22 from which the potatoes or other material may be fed to the extruding device. A tapered slot 23 is formed in the plate 21 and acts to distribute the material uniformly throughout the entire length of the cylinder 10. The slot 23 has one edge 24 parallel to the axis of the cylinder 10 and another longitudinal edge 25 inclined with respect to the axis of the cylinder, thereby forming a triangular opening having a base substantially as wide as the conveyor 26 which feeds the material from the hopper 22 into the cylinder. The material is continually moved by means of the vanes 27 on the endless conveyor belt 26 which is supported on the pulleys 28. Because of the inclination of edge 25 of the slot 23, the incoming material begins to drop through the apex of the slot. The material which is supported by portions of the plate 21 spaced laterally from the slot is dropped into the drum only when it has progressed to a wider portion of the slot. Thus the material supported on the upper portion of plate 21 as viewed in Fig. 2 will fall through the slot 23 at the left hand end of the slot and the material at the lower portion of plate 21 will fall through the slot only at its right hand end. The inclination of the edge 25 being uniform, the distribution of the material likewise will be uniform.

Formed in the wall of the cylindrical drum 10 are a plurality of apertures 29 each of which has a converging mouth portion 30 by means of which the diameter of the extruded string of material may be gradually reduced. The apertures 29 are arranged in rows and are spaced by the longitudinally extending ribs 31 which are preferably semicircular in cross section, although other curved shapes may be used if desired. These ribs 31 serve to bring the material under the smooth surface of the pressure roller 10, and further present only curved surfaces to the material, so that little, if any, shearing action takes place. The material is pressed into the apertures 29 and the material is subjected to slight lateral and axial compression to mold and extrude into strings or strips.

In operation, the material to be extruded is dumped into the hopper 22 whence it is carried by the vanes 27 on the conveyor belt 26 to the slot 23. The slot 23 serves to feed the material at a uniform rate and deliver it equally throughout the entire length of the cylindrical drum 10. The material falls into the space between the cylindrical drum 10 and the smooth pressure roller 15, and is gently and firmly pressed through the apertures 29 and extruded in the form of strings or rods. The longitudinal ribs 31 serve to bring the material under the pressure roller 15 and since these ribs have no sharp edges the material is extruded without internal shear.

This invention, therefore, provides an improved extruding device in which materials may be uniformly extruded in portions of substantially uniform density throughout and without material alteration of their physical structure. As has been pointed out, this is especially important where the extruded material is the potato, since if a usable product is to be obtained, the potato must be extruded without damaging the granules of starch. The present construction is especially adapted for extruding such materials since the extrusion process may be accomplished without any rubbing action and the material is at no time presented to sharp surfaces which may damage the cell structure or rupture the starch granules.

The above description is illustrative only of a specific embodiment of the invention, which is not intended to be limited in any way thereby except as defined in the appended claims.

I claim:

1. An extruding device comprising a cylindrical drum rotatable about its axis, a plurality of longitudinally extending, spaced, ribs having curved inwardly directed surfaces on the inner surface of the drum, means forming a plurality of apertures in the spaces between the ribs, each of the said apertures having a wide mouth portion converging to a narrow throat portion, and a pressure roller for pressing material through the said apertures.

2. An extruding device comprising a cylindrical drum rotatable about its axis, a supporting ring at one end of the said drum having internal gear teeth formed thereon, a plurality of longitudinally extending, spaced, ribs having curved inwardly directed surfaces on the inner surface of the drum, means forming a plurality of apertures in the spaces between the ribs, each aperture having a wide mouth portion converging to a narrow throat portion, a smooth-surfaced pressure roller for pressing material through the said apertures, a shaft on the roller, and a spur gear on the shaft adapted to engage the internal gear teeth on the said supporting ring for driving the drum from the pressure roller, whereby material may be extruded through the apertures without substantial damage to its cell structure.

ORVILLE GANO.